United States Patent
Chen et al.

(10) Patent No.: US 7,130,638 B2
(45) Date of Patent: Oct. 31, 2006

(54) RADIO RESOURCE ALLOCATION METHOD AND BASE STATION USING THE SAME

(75) Inventors: Lan Chen, Yokohama (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 557 days.

(21) Appl. No.: 10/020,926

(22) Filed: Dec. 19, 2001

(65) Prior Publication Data

US 2002/0082021 A1 Jun. 27, 2002

(30) Foreign Application Priority Data

Dec. 22, 2000 (JP) ............................. 2000-391393

(51) Int. Cl.
*H04Q 7/20* (2006.01)
*H04B 7/00* (2006.01)

(52) U.S. Cl. ................ 455/452.2; 455/450; 455/452.1; 455/453; 455/455; 455/509; 455/512; 455/513; 455/516; 455/517; 455/525; 455/631; 455/456.1; 455/406.2

(58) Field of Classification Search ................ 455/450, 455/452, 452.2, 453, 455, 456.1, 456.2, 509, 455/512, 513, 516, 517, 525, 63.1
See application file for complete search history.

(56) References Cited

U.S. PATENT DOCUMENTS

| | | | |
|---|---|---|---|
| 4,881,271 A | 11/1989 | Yamauchi et al. | |
| 5,724,665 A | 3/1998 | Abbasi et al. | |
| 5,867,789 A | 2/1999 | Olds et al. | |
| 6,112,101 A * | 8/2000 | Bhatia et al. | 455/512 |
| 6,366,780 B1 * | 4/2002 | Obhan | 455/453 |
| 6,868,277 B1 * | 3/2005 | Cerwall et al. | 455/509 |

FOREIGN PATENT DOCUMENTS

| | | |
|---|---|---|
| EP | 0 686 915 | 12/1995 |
| EP | 0 766 416 | 4/1997 |
| EP | 0 844 800 | 5/1998 |
| EP | 1 061 760 | 12/2000 |
| JP | 01-122219 | 5/1989 |
| JP | 08-223106 | 8/1996 |
| JP | 2000-316183 | 11/2000 |

OTHER PUBLICATIONS

C. Mihailescu, et al., Vehicular Technology Conference, XP-010288215, pp. 1695-1699, "Dynamic Resource Allocation in Locally Centralized Cellular Systems", May 18, 1998.

* cited by examiner

*Primary Examiner*—Matthew D. Anderson
*Assistant Examiner*—Yuwen Pan
(74) *Attorney, Agent, or Firm*—Oblon, Spivak, McClelland, Maier & Neustadt, P.C.

(57) ABSTRACT

In a radio resource allocation method of the present invention, use-state information of radio resources and priority information of mobile stations using the same radio resources of both a base station of concern and neighboring base stations is detected at the base station of concern. A new radio resource is allocated to a link between the base station of concern and a requesting mobile station in a cell site of the base station of concern based on the use-state information and the priority information of both the base station and the neighboring base stations.

16 Claims, 7 Drawing Sheets

FIG.2

| BS NO. | RESOURCE-1 | | RESOURCE-2 | | .... | RESOURCE-N | |
|---|---|---|---|---|---|---|---|
| 1 | UP LINK IN USE | PRIORITY HIGH | NOT IN USE | – | ... | DN LINK IN USE | PRIORITY LOW |
| 2 | NOT IN USE | – | NOT IN USE | – | ... | NOT IN USE | – |
| 3 | DN LINK IN USE | PRIORITY HIGH | DN LINK IN USE | PRIORITY HIGH | ... | NOT IN USE | – |
| .... | ... | ... | ... | ... | ... | .... | .... |
| M | DN LINK IN USE | PRIORITY HIGH | NOT IN USE | – | | UP LINK IN USE | PRIORITY HIGH |

RADIO RESOURCE ALLOCATION METHOD AND BASE STATION USING THE SAME

BACKGROUND OF THE INVENTION

1. Field of the Invention

The present invention relates to a radio resource allocation method that controls allocation of up/down link radio resources to mobile stations linked to a base station for use in mobile communications between the mobile stations through the base station. Further, the present invention relates to a base station that uses the radio resource allocation method for mobile communications between mobile stations through the base station.

2. Description of the Related Art

With the advent of recent multimedia services, mobile communication systems have become to utilize not only the existing voice communications but also non-voice communications including data and image transmissions. In the non-voice communications, the amount of the uplink traffic and the amount of the downlink traffic are often diversified in a non-symmetrical manner. Moreover, the non-voice communications are likely to undergo variations of the amounts of the up/downlink traffic that are larger than those in the voice communications.

In order to resolve the above problems, it is desirable that radio resources, which must be allocated to mobile stations linked to the base station of concern, be shared for both the uplink and the downlink related to the base station of concern. Radio resources with respect to the present invention mean the radio channels or channel timeslots that have to be allocated to and shared by the respective links between the mobile stations and the base station of concern, namely, both the uplinks between the respective mobile stations and the base station and the downlinks between the base station and the respective mobile stations.

In a conventional radio resource allocation method, the radio resources are allocated to the uplinks and the downlinks based solely on the comparison of the amount of the uplink traffic and the amount of the downlink traffic in the cell site of the base station of concern. According to the conventional method, when the uplink traffic within the cell site is larger in amount than the downlink traffic there, the base station allocates a larger amount of radio resources to the uplinks than to the downlinks. On the other hand, when the downlink traffic in the cell site of the base station is larger in amount than the uplink traffic there, the base station allocates a larger amount of radio resources to the downlinks than to the uplinks.

However, according to the above-described conventional method, there is the possibility that the radio resources allocated to the links in the cell site of the base station of concern are being used in the radio resources allocated to the links in the cell site of a neighboring base station located adjacent to the base station of concern. In such a case, the interference of the radio resources between the base station of concern and the neighboring base station takes place, and the characteristics of the data transmission in both the cell sites of the base stations will deteriorate.

When the direction of the link data transmission in the cell site of the base station of concern is opposite to the direction of the link data transmission in the cell site of the neighboring base station in the case of allocating the radio resources to both the uplinks and the downlinks, the interference of the radio resources between the base stations or between the mobile stations is likely to take place. Hence, in the case of allocating the radio resources to both the uplinks and the downlinks based solely on the comparison of the uplink and downlink traffic amounts in the cell site of the base station of concern, the interference of the radio resources between the base stations or between the mobile stations is likely to take place, and it will cause the quality of the mobile communications to deteriorate. Further, the interference of the radio resources will cause an increase of the number of retransmissions and an increase of the delay of data transmission, and therefore the efficiency of utilization of the radio resources of the entire mobile communication system will be considerably lowered.

SUMMARY OF THE INVENTION

An object of the present invention is to provide an improved radio resource allocation method in which the above-described problems are eliminated.

Another object of the present invention is to provide a radio resource allocation method that provides efficient use of up/down link radio resources of a base station of concern for use in mobile communications between the mobile stations linked to the base station without causing the interference of the radio resources between the base stations or the mobile stations thereof.

Another object of the present invention is to provide a base station that uses a radio resource allocation method that provides efficient use of up/down link radio resources of a base station of concern for use in mobile communications between the mobile stations linked to the base station without causing the interference of the radio resources between the base stations or the mobile stations thereof.

The above-mentioned objects of the present invention are achieved by a method of allocating a new radio resource to a link between a base station and a requesting mobile station in a cell site of the base station, comprising the steps of: detecting use-state information of radio resources and priority information of mobile stations using the same radio resources of both the base station of concern and neighboring base stations; and allocating a new radio resource to the link between the base station of concern and the requesting mobile station based on the use-state information and the priority information.

The above-mentioned objects of the present invention are achieved by a base station including a resource allocation control unit which allocates a new radio resource to a link between the base station and a requesting mobile station in a cell site of the base station, the resource allocation control unit comprising: a first unit which detects use-state information of radio resources and priority information of mobile stations using the same radio resources of both the base station of concern and neighboring base stations; and a second unit which allocates a new radio resource to the link between the base station of concern and the requesting mobile station based on the use-state information and the priority information.

The radio resource allocation method and the base station using the same according to the present invention can prevent the occurrence of the interference of radio resources between the base stations or between the mobile stations. It is possible for the base station of the present invention to provide efficient use of the up/down link radio resources of the base station of concern for use in mobile communications between the mobile stations linked to the base station of concern without causing the interference of the radio resources between the base stations or between the mobile stations.

BRIEF DESCRIPTION OF THE DRAWINGS

Other objects, features and advantages of the present invention will become apparent from the following detailed description when read in conjunction with the accompanying drawings.

FIG. 2 is a diagram for explaining a radio resource management table that is used by the radio resource allocation method of the first preferred embodiment.

DETAILED DESCRIPTION OF PREFERRED EMBODIMENTS

A description will now be provided of preferred embodiments of the present invention with reference to the accompanying drawings.

Figure 1:
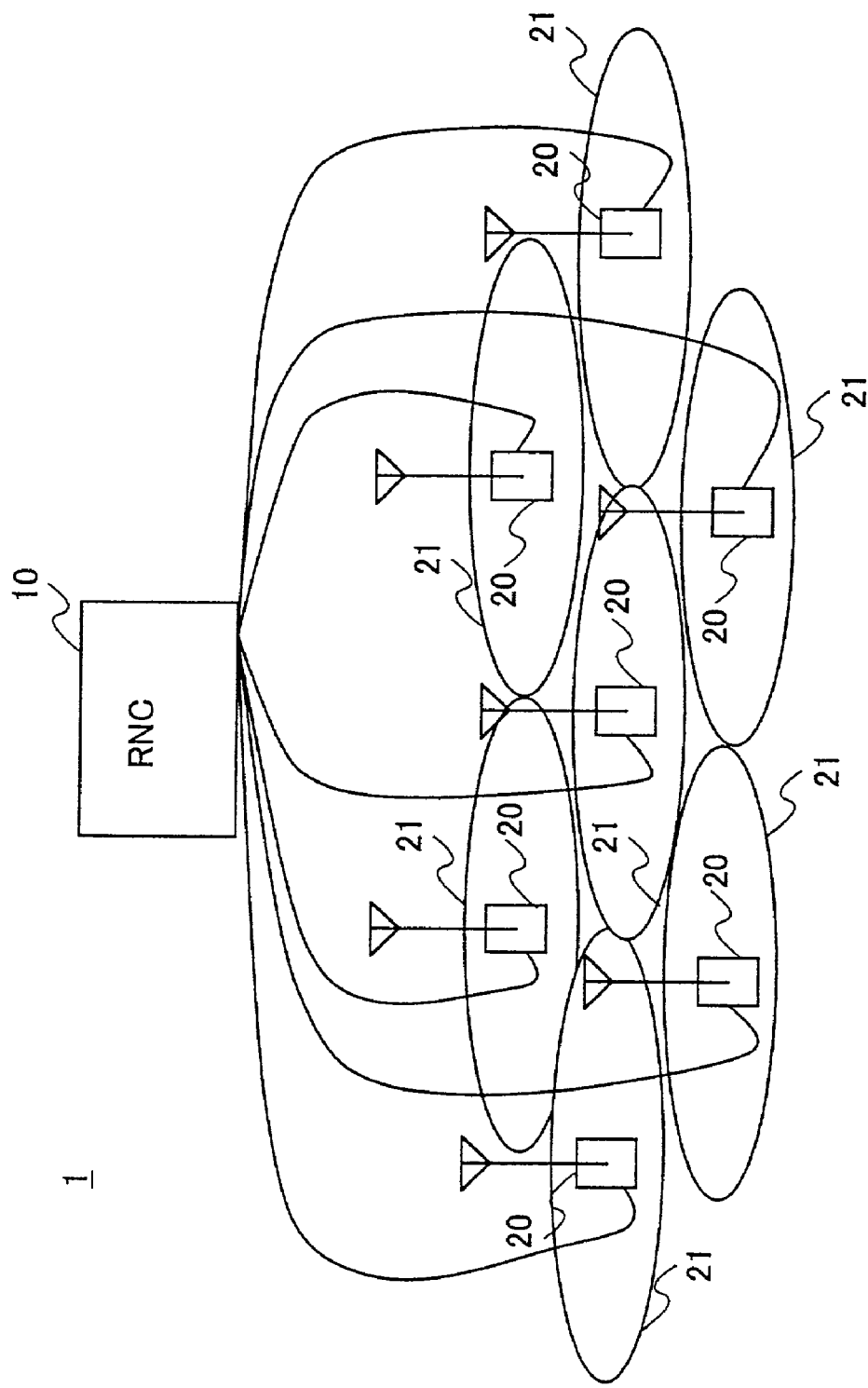
FIG. 1 is a diagram of a mobile communication system in which a first preferred embodiment of the radio resource allocation method of the invention is incorporated.

FIG. 1 shows a mobile communication system in which a first preferred embodiment of the radio resource allocation method of the invention is incorporated.

As shown in FIG. 1, the mobile communication system 1 of the present embodiment is formed by a radio network controller 10 (called RNC 10) and a plurality of base stations 20. In the present embodiment, the RNC 10 maintains both the use-state information of a set of radio resources allocated within the cell site 21 of each of the base stations 20 and the priority information related to the mobile stations, which are linked to each base station 20 and use the radio resources allocated thereto.

In the mobile communication system 1 of the present embodiment, each of the base stations 20 allocates a new radio resource to the link between a requesting mobile station and the base station 20 of concern based on the use-state information of the radio resources in the cell site of each of the base station 20 of concern and its neighboring base stations 20 and the priority information related to the mobile stations using the radio resources allocated thereto, which are both managed by the RNC 10.

FIG. 2 shows an example of a radio resource management table that is used by the radio resource allocation method of the first preferred embodiment.

In the present embodiment, the RNC 10 maintains the radio resource management table as shown in FIG. 2, and manages the use-state information of a set of radio resources allocated within the cell site 21 of each of the base stations 20 and the priority information of the mobile stations linked to each base station 20 and using the radio resources allocated thereto.

In the radio resource management table shown in FIG. 2, each of the base stations 20 is identified by its base station number "BS No.". For example, with respect to the base station #1 (whose base station number is equal to 1), the use-state information of the radio resource management table currently indicates that the radio resource indicated by "RESOURCE-1" is allocated to the uplink between a mobile station and the base station, and the priority information of the radio resource management table currently indicates that a high level of priority is assigned to the mobile station using the radio resource indicated by "RESOURCE-1".

In the mobile communication system 1 of the present embodiment, when allocating the radio resources to the mobile stations, each of the base stations 20 detects the use-state information of the radio resources in the cell site 21 of the base station 20 of concern and the priority information of the mobile stations using the radio resources allocated thereto by accessing the radio resource management table of the RNC 10. At the same time, the base station 20 of concern sends an inquiry of the radio resource allocation of neighboring base stations 20 (located adjacent to the base station 20 itself) to the RNC 10, and receives, from the radio resource management table of the RNC 10, the use-state information of the radio resources in the cell site 21 of each of the neighboring base stations 20 and the priority information of the mobile stations using the radio resources allocated thereto.

Accordingly, in the present embodiment, the base station 20 of concern allocates the radio resources to the mobile stations in the cell site 21 thereof based on the use-state information of the radio resources of the base station 20 of concern and the priority information of the mobile stations using the radio resources allocated thereto and based on the use-state information of the radio resources of the neighboring base stations and the priority information of the mobile stations using the radio resources allocated thereto. Therefore, it is possible for the base station of the present embodiment to provide efficient use of the up/down link radio resources of the base station of concern for use in mobile communications between the mobile stations linked to the base station without causing the interference of the radio resources between the base stations or the mobile stations thereof.

Figure 3:
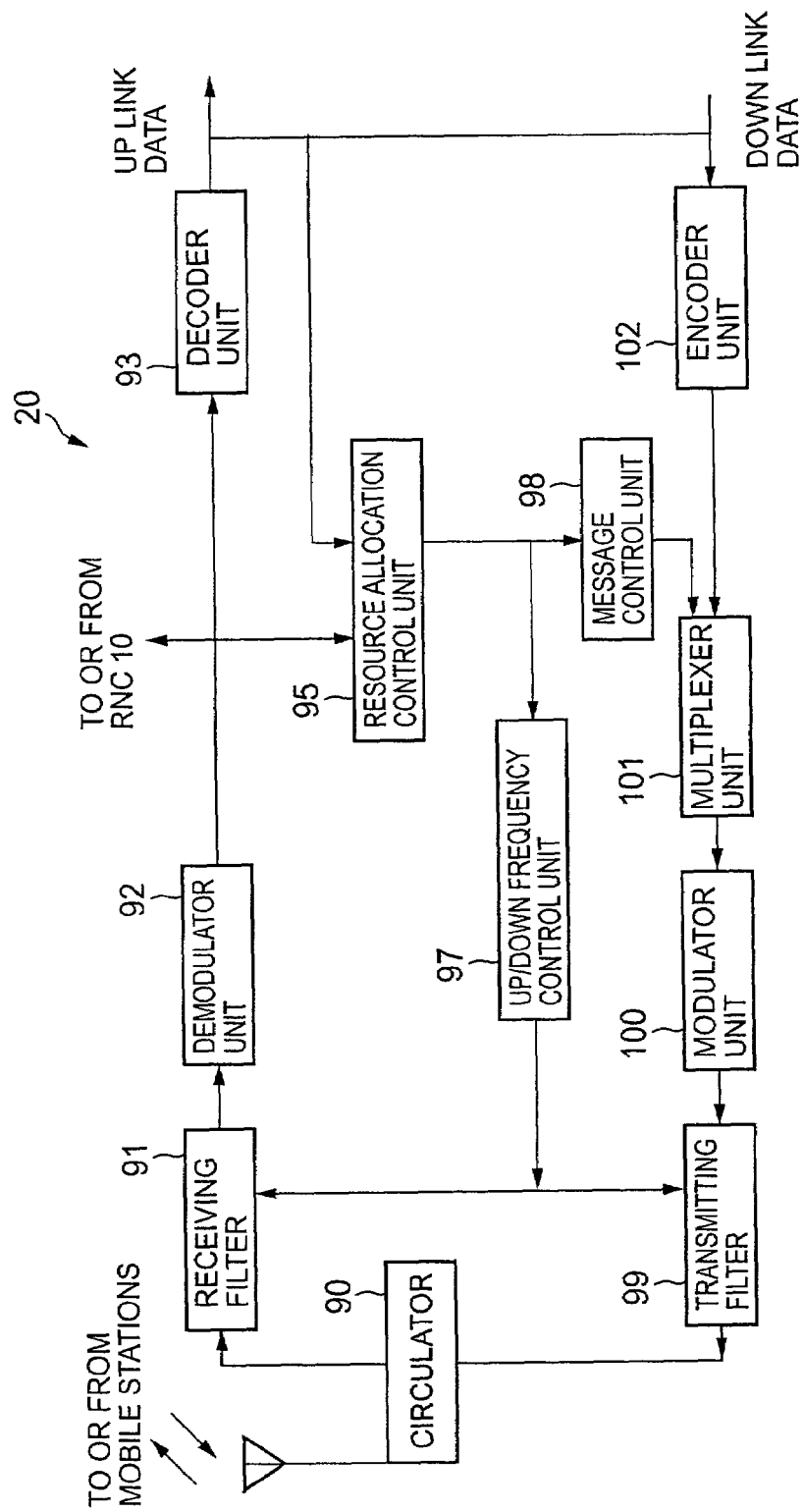
FIG. 3 is a block diagram of a base station in which the radio resource allocation method of the first preferred embodiment is incorporated.

FIG. 3 shows a base station which uses the radio resource allocation method of the first preferred embodiment.

As shown in FIG. 3, the base station 20 of the present embodiment generally includes a circulator 90, a receiving filter 91, a demodulator unit 92, a decoder unit 93, a resource allocation control unit 95, an up/down frequency control unit 97, a message control unit 98, a transmitting filter 99, a modulator unit 100, a multiplexer unit 101, and an encoder unit 102.

In the base station 20 of the present embodiment, a signal sent from a mobile station (called the uplink signal) is received at the circulator 90, and it is delivered to the receiving filter 91, the demodulator unit 92 and the decoding unit 93, in this order, so that the unlink data is created at the output of the decoding unit 93 from the received uplink signal.

Suppose that a request for allocation of a new radio resource to the uplink (or a request for allocation of a new radio resource to the downlink) sent by a requesting mobile station is received at the base station 20. In this case, the received resource allocation request is delivered to the resource allocation control unit 95.

When the resource allocation request is received, the resource allocation control unit 95 analyzes the contents of the request and detects the identification of the requesting mobile station and the link between the requesting mobile station and the base station 20 to which the new radio resource is to be allocated. The resource allocation control unit 95 detects the use-state information of the radio resources within the cell site 21 of the base station 20 of concern and the priority information of the mobile station using the radio resource allocated thereto by accessing the radio resource management table of the RNC 10. At the same time, the resource allocation control unit 95 sends an inquiry of the radio resource allocation of neighboring base stations 20 (located adjacent to the base station 20 of concern) to the RNC 10, and receives, from the radio resource management table of the RNC 10, the use-state information of the radio resources allocated within the cell site 21 of each of the neighboring base stations 20 and the priority information of the mobile stations using the radio resources allocated thereto.

The identifications (the base station numbers) of the neighboring base stations 20, which are located adjacent to the base station 20 of concern, are predetermined and recorded in the resource allocation control unit 95 at the time of installing the respective base stations 20. The base station 20 of concern maintains such base station numbers of the neighboring base stations 20. As described above, by sending the inquiry of the radio resource allocation of the neighboring base stations 20 to the RNC 10, the resource allocation control unit 95 detects, from the radio resource management table of the RNC 10, the use-state information of the radio resources in the cell site 21 of each of the neighboring base stations 20 and the priority information of the mobile stations using the radio resources allocated thereto.

Concerning the priority information of the radio resource management table of the present embodiment, a high level of priority is assigned to a mobile station when the real-time processing related to the mobile station, such as the voice transmission, is needed. On the other hand, when the real-time processing related to the mobile station is not needed, a low level of priority is assigned to the mobile station. Alternatively, the priority information of the radio resource management table may be provided such that a high level of priority is assigned to the mobile station when it is contracted to assure high-quality communication of the mobile station, and otherwise a low level of priority is assigned to the mobile station.

After the use-state information of the radio resources allocated for the neighboring base stations 20 and the priority information of the mobile stations are received, the resource allocation control unit 95 determines the radio resource to be allocated to the requesting mobile station within the cell site 21 of the base station 20 of concern based on the use-state information of the radio resources for the base station 20 of concern and the priority information of the mobile stations using the radio resources allocated thereto as well as based on the use-state information of the radio resources for each neighboring base station and the priority information of the mobile stations using the radio resources allocated thereto. The control procedure of the resource allocation control unit 95 to determine the radio resource will be described below with reference to FIG. 4.

The result of the radio resource allocation determined by the resource allocation control unit 95 is supplied to the up/down frequency control unit 97. The up/down frequency control unit 97 produces up/down frequency band control information based on the radio resource allocation result, and outputs the up/down frequency band control information to each of the receiving filter 91 and the transmitting filter 99. The up/down frequency bands for the receiving filter 91 and the transmitting filter 99 are determined by adjustment based on the up/down frequency band control information output by the up/down frequency control unit 97. In the above-described manner, the base station 20 allocates the radio resource to the uplink between the requesting mobile station and the base station 20 of concern, in response to the radio resource allocation request.

Further, in the base station 20 of FIG. 3, the result of the radio resource allocation determined by the resource allocation control unit 95 is also supplied to the multiplexer unit 101 via the message control unit 98. The multiplexer unit 101 produces a multiplexed signal including the radio resource allocation result supplied from the resource allocation control unit 95 and the downlink data supplied from the encoder unit 102. The multiplexed signal is delivered from the multiplexer unit 101 to the modulator unit 100, the transmitting filter 99 and the circulator 90, in this order, so that it is transmitted from the base station 20 of concern to the requesting mobile station. As the requesting mobile station receives the multiplexed signal from the base station 20, the requesting mobile station recognizes that the radio resource is allocated to the mobile station, based on the resource allocation result included in the multiplexed signal.

When the radio resource allocation and the radio resource releasing are performed by the base station 20, the resource allocation control unit 95 transmits a radio resource notification to the RNC 10. This radio resource notification contains the updated use-state information of the radio resources in the cell site 21 of the base station 20 of concern and the priority information of the mobile stations using the radio resources allocated thereto. When the radio resource notification from the base station 20 is received, the RNC 10 modifies the radio resource management table based on the received notification so that the radio resource management table is updated.

Figure 4:
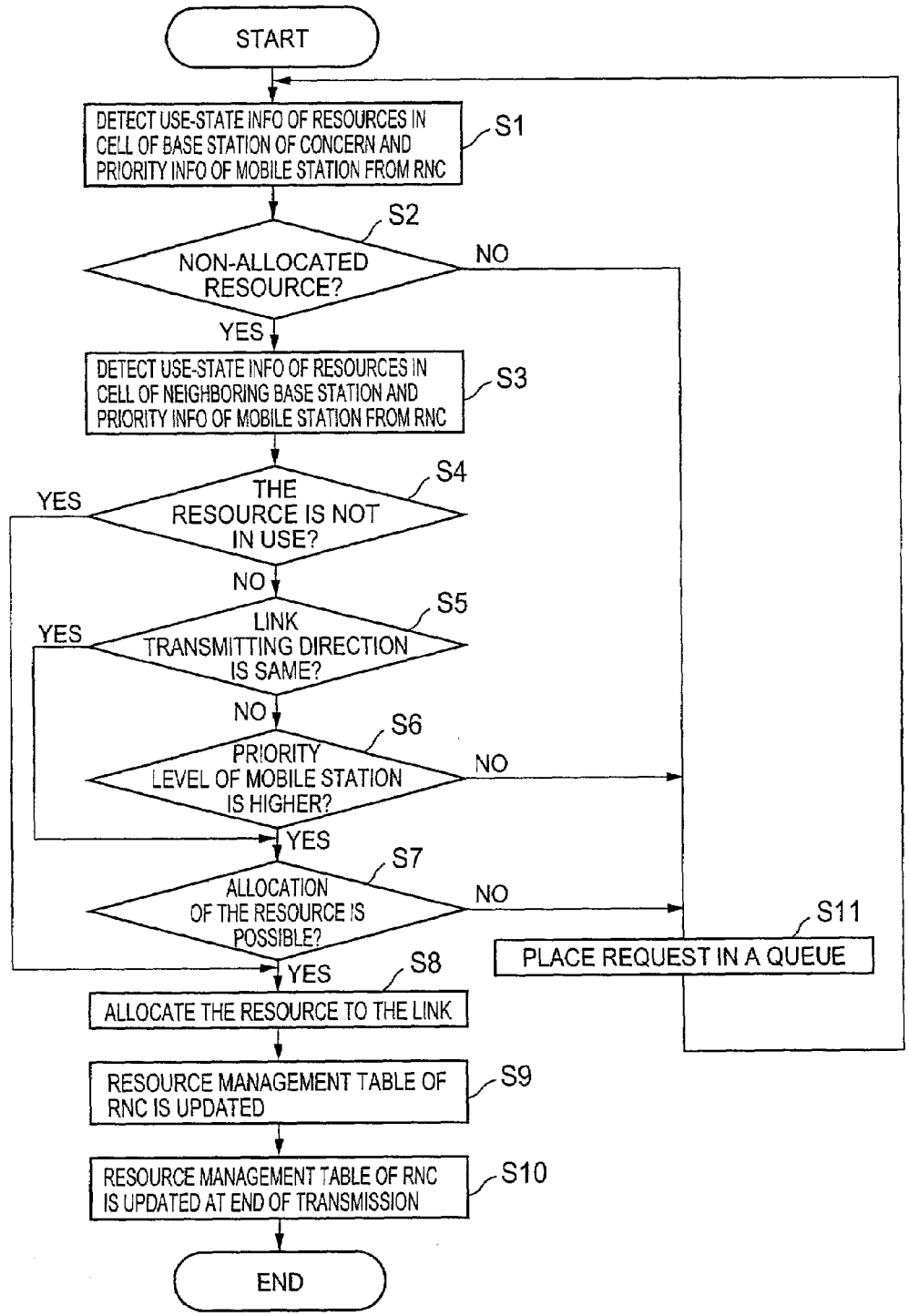
FIG. 4 is a flowchart for explaining a resource allocation control process performed by the base station that uses the radio resource allocation method of the first preferred embodiment.

FIG. 4 shows a resource allocation control process which is executed by the resource allocation control unit 95 of the base station 20 that uses the radio resource allocation method of the first preferred embodiment.

The control process shown in FIG. 4 is started by the resource allocation control unit 95 of the base station 20 in response to a resource allocation request that is sent by a requesting mobile station upon occurrence of a call or a packet data. Hereinafter, the resource allocation control unit 95 is referred to as the control unit 95 for the sake of convenience.

As shown in FIG. 4, at the start of the resource allocation control process, the control unit 95 detects the use-state information of radio resources in the cell site of the base station 20 of concern and the priority information of the requesting mobile station by accessing the radio resource management table of the RNC 10 (S1).

After the step S1 is performed, the control unit 95 determines whether there is a non-allocated radio resource in the cell site of the base station 20 of concern (S2). When the result at the step S2 is negative, the control unit 95 places the resource allocation request into a radio resource queue (S11). In this case, after a predetermined period or a randomly set period has elapsed, the control of the control unit 95 is transferred to the step S1 and the control unit 95 repeats performing the subsequent steps.

When the result at the step S2 is affirmative (a non-allocated radio resource exists), the control unit 95 detects the use-state information of radio resources in the cell sites of the neighboring base stations 20 and the priority information of mobile stations using the radio resources allocated thereto by sending an inquiry to the RNC 10 and accessing the radio resource management table of the RNC 10 (S3).

After the step S3 is performed, the control unit 95 determines whether the non-allocated radio resource in the cell site of the base station 20 of concern is not in use in the cell sites of the neighboring base stations 20, based on the use-state information related to the neighboring base stations 20 (S4).

When the result at the step S4 is affirmative, the control unit 95 allocates the radio resource to the link between the requesting mobile station and the base station 20 of concern (S8). After the step S8 is performed, the control unit 95 transmits the radio resource notification to the RNC 10, the notification containing the updated use-state information of the radio resources in the cell site 21 of the base station 20 of concern and the priority information of the mobile stations using the radio resources allocated thereto, so that the radio resource management table of the RNC 10 is updated (S9).

After the step S9 is performed and the radio resource releasing is performed at the end of the link data transmission, the control unit 95 transmits again the radio resource notification to the RNC 10, the notification containing the updated use-state information of the radio resources in the cell site 21 of the base station 20 of concern and the priority information of the mobile stations using the radio resources allocated thereto, so that the radio resource management table of the RNC 10 is updated (S10). After the step S10 is performed, the resource allocation control process of FIG. 4 ends.

When the result at the step S4 is negative (the radio resource is in use), the control unit 95 determines whether the direction of the link data transmission related to the non-allocated radio resource in the cell site of the base station 20 of concern is the same as the direction of the link data transmission related to the allocated radio resource in the cell sites of the neighboring base stations 20 (S5).

When the result at the step S5 is affirmative (the direction of the link data transmission is the same), the interference of radio resources between the base stations 20 or between the mobile stations is negligible. In this case, the control unit 95 determines whether the allocation of the non-allocated radio resource in the cell site of the base station 20 of concern to the link between the requesting mobile station and the base station 20 of concern is possible (S7). For example, in the step S7, the control unit 95 makes determination as to whether a predetermined SIR (signal-to-interference ratio) is met by the radio resource allocation. When the predetermined SIR is met, it is determined that the resource allocation is possible.

When the result at the step S7 is affirmative (the resource allocation is possible), the control unit 95 performs the steps S8 to S10 described above. On the other hand, when the result at the step S7 is negative (the resource allocation is not possible), the control unit 95 performs the step S11 described above.

When the result at the step S5 is negative (the direction of the link data transmission is opposite), the interference of radio resources between the base stations 20 or between the mobile stations is likely to occur. In this case, the control unit 95 determines whether the level of priority of the requesting mobile station in the cell site of the base station 20 of concern is higher than the level of priority of each of the mobile stations using the duplicate radio resource in the cell sites of the neighboring base stations 20, based on the priority information related to the base station 20 of concern and the priority information related to the neighboring base stations 20 (S6).

When the result at the step S6 is negative (the level of priority of the requesting mobile station is not higher), the control unit 95 performs the step S11 described above. When the result at the step S6 is affirmative (the level of priority of the requesting mobile station is higher), the control unit 95 performs the step S7 described above.

According to the above-described embodiment, the radio resource allocation method and the base station using the same can prevent the occurrence of the interference of radio resources between the base stations or between the mobile stations by using the radio resource management table of the RNC 10. It is possible for the base station of the above-described embodiment to provide efficient use of the up/down link radio resources of the base station of concern for use in mobile communications between the mobile stations linked to the base station of concern without causing the interference of the radio resources between the base stations or between the mobile stations.

Next, a description will be given of a second preferred embodiment of the radio resource allocation method of the present invention.

In the previous embodiment, the RNC 10 maintains the use-state information of the radio resources in the cell sites of the respective base stations 20 and the priority information of the mobile stations linked thereto and using the radio resources allocated. In the present embodiment, each of the base stations in the mobile communication system maintains the use-state information of the radio resources in the cell site of the base station of concern and the priority information of the mobile stations linked to the base station of concern and using the radio resources allocated. When allocating a new radio resource, the base station of concern detects the use-state information of the radio resources in the cell sites of the neighboring base stations and the priority information of the mobile stations linked the neighboring base stations by accessing the respective neighboring base stations.

Figure 5:
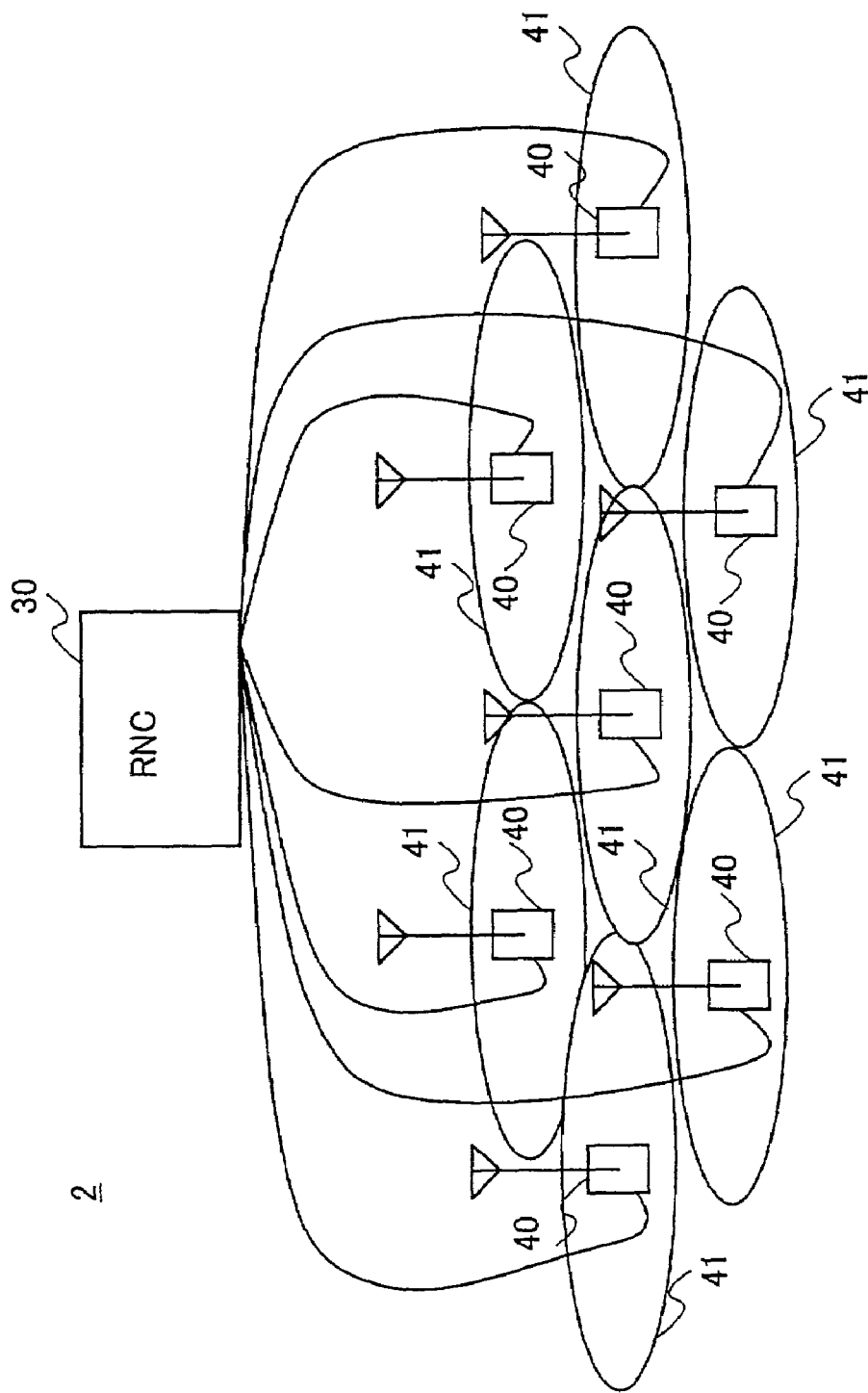
FIG. 5 is a diagram of a mobile communication system in which a second preferred embodiment of the radio resource allocation method of the invention is incorporated.

FIG. 5 shows a mobile communication system in which a second preferred embodiment of the radio resource allocation method of the invention is incorporated.

As shown in FIG. 5, the mobile communication system 2 of the present embodiment is formed by a radio network controller 30 (called RNC 30) and a plurality of base stations 40. In the present embodiment, when allocating a new radio resource, the base station 40 of concern detects the use-state information of the radio resources in the cell sites of the neighboring base stations 40 and the priority information of the mobile stations linked to the neighboring base stations 40 by accessing the respective neighboring base stations 40. The radio resource allocation is carried out by the base station 40 of concern based on the use-state information of the radio resources in the cell site 41 of each of the base station 40 of concern and the neighboring base stations 40 and the priority information of the mobile stations using the radio resources allocated.

Figure 6:
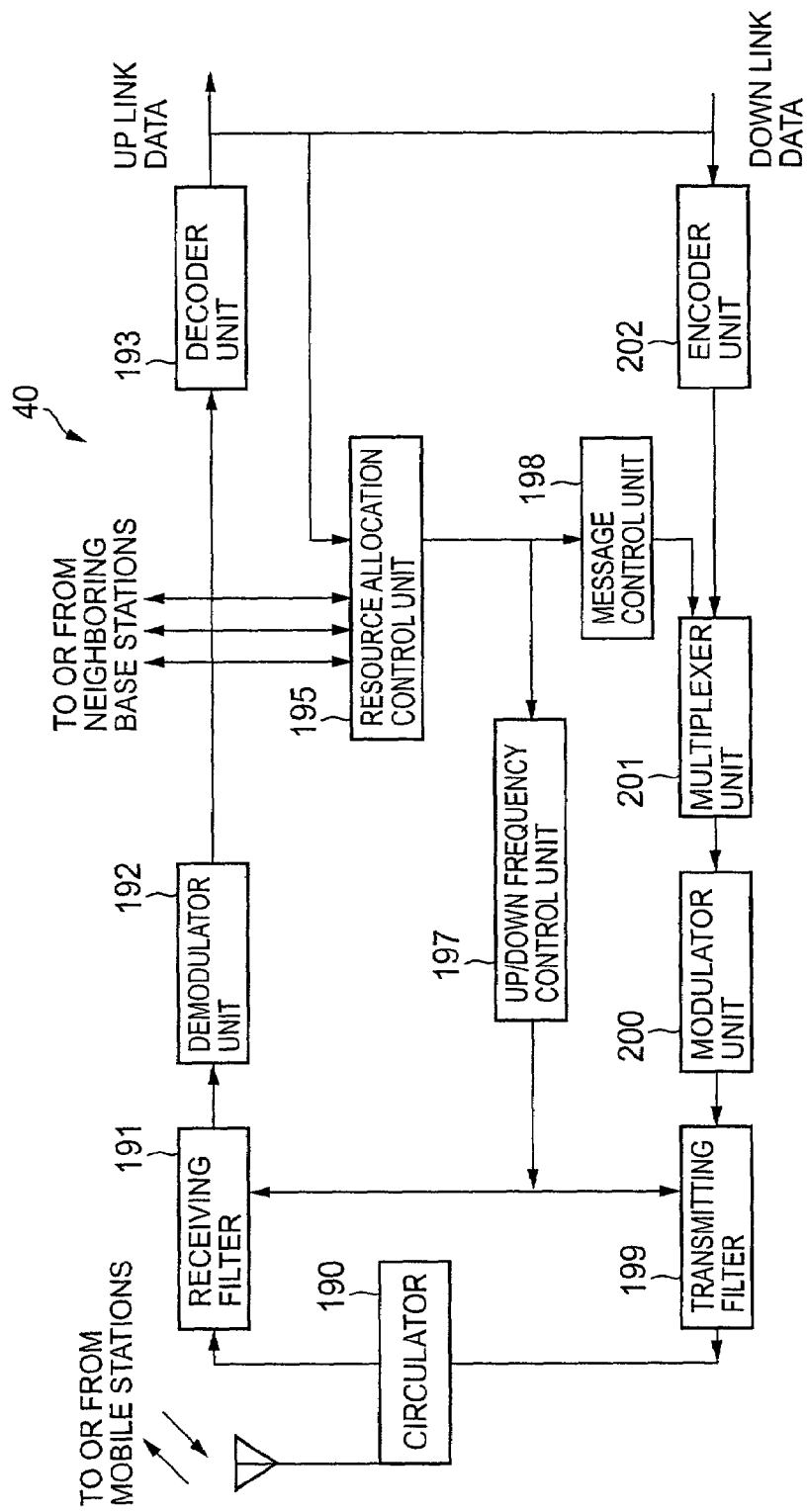
FIG. 6 is a block diagram of a base station in which the radio resource allocation method of the second preferred embodiment is incorporated.

FIG. 6 shows a base station which uses the radio resource allocation method of the second preferred embodiment.

As shown in FIG. 6, the base station 40 of the present embodiment generally includes a circulator 190, a receiving filter 191, a demodulator unit 192, a decoder unit 193, a resource allocation control unit 195, an up/down frequency control unit 197, a message control unit 198, a transmitting filter 199, a modulator unit 200, a multiplexer unit 201, and an encoder unit 202.

In the base station 40 of the present embodiment, a signal sent from a mobile station (the uplink signal) is received at the circulator 190, and it is delivered to the receiving filter 191, the demodulator unit 192 and the decoding unit 193, in this order, so that the unlink data is created at the output of the decoding unit 193 from the received uplink signal.

Suppose that a request for allocation of a new radio resource to the uplink sent by a requesting mobile station is received at the base station 40. In this case, the received resource allocation request is delivered to the resource allocation control unit 195.

When the resource allocation request is received, the resource allocation control unit 195 analyzes the contents of the request and detects the identification of the requesting mobile station and the link between the requesting mobile station and the base station 40 to which the new radio resource is to be allocated. The resource allocation control unit 195 detects the use-state information of the radio resources in the cell site 41 of the base station 40 of concern and the priority information of the mobile station using the radio resource allocated thereto, which are maintained by the base station 40. At the same time, the resource allocation control unit 195 sends an inquiry of the radio resource allocation to neighboring base stations 40 (located adjacent to the base station 40 of concern), and detects, from the neighboring base stations 40, the use-state information of the radio resources in the cell site 41 of each of the neighboring base stations 40 and the priority information of the mobile stations using the radio resources allocated.

The identifications (the base station numbers) of the neighboring base stations 40, which are located adjacent to the base station 40 of concern, are predetermined and recorded in the resource allocation control unit 195 at the time of installing the respective base stations 40. The base station 40 of concern maintains such base station numbers of the neighboring base stations 40. As described above, by sending the inquiry of the radio resource allocation to the neighboring base stations 40, the resource allocation control unit 195 detects the use-state information of the radio resources in the cell site 41 of each of the neighboring base stations 40 and the priority information of the mobile stations using the radio resources allocated thereto.

After the use-state information of the radio resources allocated for the neighboring base stations 40 and the priority information of the mobile stations are detected, the resource allocation control unit 195 determines the new radio resource to be allocated to the requesting mobile station in the cell site 41 of the base station 40 of concern based on the use-state information of the radio resources for the base station 40 of concern and the priority information of the mobile stations using the radio resources allocated thereto as well as based on the use-state information of the radio resources for each neighboring base station 40 and the priority information of the mobile stations using the radio resources allocated thereto. The control procedure of the resource allocation control unit 195 to determine the new radio resource will be described below with reference to FIG. 7.

The operations of the resource allocation control unit 195 after the determination of the new radio resource are essentially the same as those of the previous embodiment of FIG. 3, and a description thereof will be omitted.

Further, in the present embodiment, when an inquiry of the radio resource allocation from a neighboring base station 40 is received at the base station 40 of concern, the resource allocation control unit 195 transmits to the neighboring base station 40 the use-state information of the radio resources in the cell site 41 of the base station 40 of concern and the priority information of the mobile station using the radio resource allocated thereto.

Further, in the present embodiment, when transmitting the inquiry, the use-station information or the priority information from the base station 40 of concern to the neighboring base station 40 or vice verse, a wired or wireless dedicated radio channel is used as a path of the data transmission.

Figure 7:
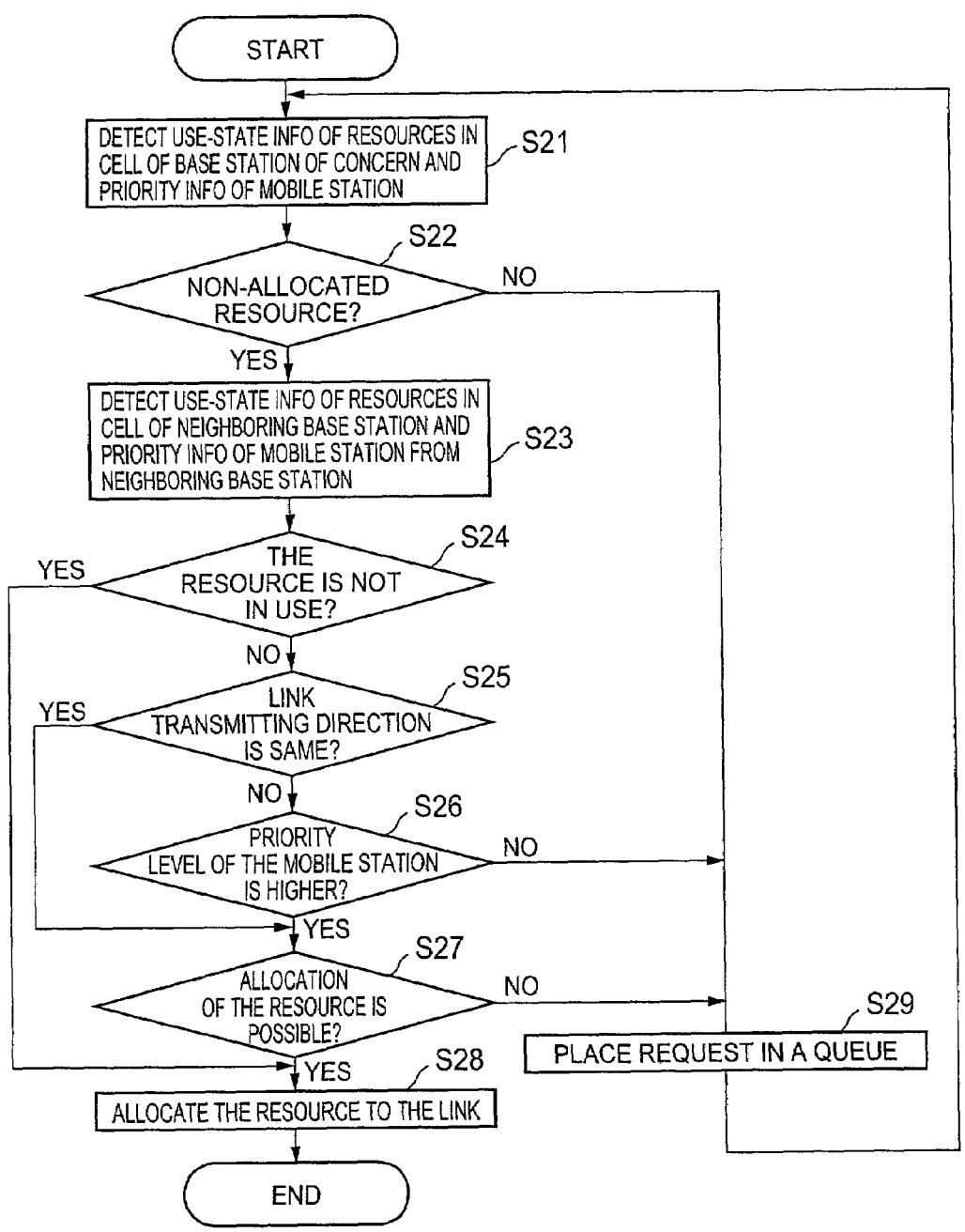
FIG. 7 is a flowchart for explaining a resource allocation control process performed by the base station that uses the radio resource allocation method of the second preferred embodiment.

FIG. 7 shows a resource allocation control process performed by the resource allocation control unit 195 of the base station 40 that uses the radio resource allocation method of the second preferred embodiment.

The control process shown in FIG. 7 is started by the resource allocation control unit 195 of the base station 40 in response to a resource allocation request that is sent by a requesting mobile station upon occurrence of a call or a packet data. Hereinafter, the resource allocation control unit 195 is referred to as the control unit 195 for the sake of convenience.

As shown in FIG. 7, at the start of the resource allocation control process, the control unit 195 detects the use-state information of radio resources in the cell site of the base station 40 of concern and the priority information of the requesting mobile station which are both maintained by the base station 40 of concern (S21).

After the step S21 is performed, the control unit determines whether there is a non-allocated radio resource in the cell site 41 of the base station 40 of concern (S22). When the result at the step S22 is negative, the control unit 195 places the resource allocation request into a radio resource queue (S29). In this case, after a predetermined period or a randomly set period has elapsed, the control of the control unit 195 is transferred to the step S21 and the control unit 195 repeats performing the subsequent steps.

When the result at the step S22 is affirmative (a non-allocated radio resource exists), the control unit 195 detects the use-state information of radio resources in the cell sites of the neighboring base stations 40 and the priority information of mobile stations using the radio resources allocated thereto by sending an inquiry to the neighboring base stations 40 and accessing the radio resource allocation information thereof (S23).

After the step S23 is performed, the control unit 195 determines whether the non-allocated radio resource in the cell site of the base station 40 of concern is not in use in the cell sites of the neighboring base stations 40, based on the use-state information related to the neighboring base stations 40 (S24).

When the result at the step S24 is affirmative, the control unit 195 allocates the radio resource to the link between the requesting mobile station and the base station 40 of concern (S28). After the step S8 is performed, the resource allocation control process of FIG. 7 ends.

When the result at the step S24 is negative (the radio resource is in use), the control unit 195 determines whether the direction of the link data transmission related to the non-allocated radio resource in the cell site of the base station 40 of concern is the same as the direction of the link data transmission related to the allocated radio resource in the cell sites of the neighboring base stations 40 (S25).

When the result at the step S25 is affirmative (the direction of the link data transmission is the same), the interference of radio resources between the base stations 40 or between the mobile stations is negligible. In this case, the control unit 195 determines whether the allocation of the non-allocated radio resource in the cell site of the base station 40 of concern to the link between the requesting mobile station and the base station 40 of concern is possible (S27). For example, in the step S27, the control unit 195 makes determination as to whether a predetermined SIR (signal-to-interference ratio) is met by the radio resource allocation. When the predetermined SIR is met, it is determined that the resource allocation is possible.

When the result at the step S27 is affirmative (the resource allocation is possible), the control unit 195 performs the step S28 described above. On the other hand, when the result at the step S27 is negative (the resource allocation is not possible), the control unit 195 performs the step S29 described above.

When the result at the step S25 is negative (the direction of the link data transmission is opposite), the interference of radio resources between the base stations 40 or between the mobile stations is likely to occur. In this case, the control unit 195 determines whether the level of priority of the requesting mobile station in the cell site of the base station 40 of concern is higher than the level of priority of each of the mobile stations using the duplicate radio resource in the cell sites of the neighboring base stations 40, based on the priority information related to the base station 40 of concern and the priority information related to the neighboring base stations 40 (S26).

When the result at the step S26 is negative (the level of priority of the requesting mobile station is not higher), the control unit 195 performs the step S29 described above. When the result at the step S26 is affirmative (the level of priority of the requesting mobile station is higher), the control unit 195 performs the step S27 described above.

According to the above-described embodiment, the radio resource allocation method and the base station using the same can prevent the occurrence of the interference of radio resources between the base stations or between the mobile stations by using the radio resource allocation information maintained by the individual base stations 40. It is possible for the base station of the above-described embodiment to provide efficient use of the up/down link radio resources of the base station of concern for use in mobile communications between the mobile stations linked to the base station of concern without causing the interference of the radio resources between the base stations or between the mobile stations.

In the above embodiments of FIG. 1 and FIG. 5, the cell of each base station is not divided. However, the present invention is not limited to these embodiments. The radio resource allocation method of the present invention is applicable to the case in which the cell of each base station is divided into a plurality of sectors. In such alternative embodiment, the base station may be configured to detect the use-state information of radio resources related to each of the respective sectors of the cell of concern and the priority information of mobile stations using the radio resources allocated.

The present invention is not limited to the above-described embodiments, and variations and modifications may be made without departing from the scope of the present invention.

Further, the present invention is based on Japanese priority application No. 2000-391393, filed on Dec. 22, 2000, the entire contents of which are hereby incorporated by reference.

What is claimed is:

1. A resource allocation method for a base station to allocate a new radio resource to a link between the base station and a requesting mobile station in a cell site of the base station, comprising the steps of:

causing the base station to detect use-state information of radio resources in the cell site of the base station of concern and in respective cell sites of neighboring base stations and priority information of mobile stations using the same radio resource of both the base station of concern and the neighboring base stations by accessing an external radio resource management table;

causing the base station to determine whether an up/down link direction related to a non-allocated radio resource in the cell site of the base station of concern is the same as an up-down link direction related to an allocated radio resource in one of the cell sites of the neighboring base stations;

causing the base station to allocate a new radio resource to the link between the base station of concern and the requesting mobile station based on both the use-state information and the priority information in said detecting step and based on a result of the determination in said determining step;

causing the base station to determine whether a level of priority of the requesting mobile station is higher than a level of priority of each of the mobile stations using the radio resources allocated in the cell sites of the neighboring base stations, based on the priority information related to the base station of concern and the priority information related to the neighboring base stations; and causing the base station to determine whether allocation of the non-allocated radio resource in the cell site of the base station of concern to the link is possible.

2. The method according to claim 1, wherein a radio network controller maintains a radio resource management table, and, in said detecting step, the base station of concern detects the use-state information and the priority information from the radio resource management table of the radio network controller by sending an inquiry from the base station of concern to the radio network controller.

3. The method according to claim 1, wherein a radio network controller maintains a radio resource management table, and, when the radio resource allocation and radio resource releasing are performed, the base station of concern transmits a radio resource notification to the radio network controller so that the radio resource management table is updated.

4. The method according to claim 1, wherein each of the base station of concern and the neighboring base stations maintains the use-state information of that base station and the priority information of the mobile stations related to that base station, and, in said detecting step, the base station of concern detects the use-state information and the priority information from the respective neighboring base stations by sending an inquiry from the base station of concern to each of the respective neighboring base stations.

5. The method according to claim 4, wherein, when transmitting the inquiry, the use-station information or the priority information between the base station of concern and each of the neighboring base stations, a dedicated radio channel is used as a path of the data transmission.

6. The method according to claim 1, wherein each of the base station of concern and the neighboring base stations maintains the use-state information of that base station and the priority information of the mobile stations related to that base station, and, when an inquiry from one of the neighboring base stations is received at the base station of concern, the base station of concern transmits to said one of the neighboring base stations the use-state information and the priority information both related to the base station of concern.

7. The method according to claim 6, wherein, when transmitting the use-station information or the priority information between the base station of concern and said one of the neighboring base stations, a dedicated radio channel is used as a path of the data transmission.

8. The method according to claim 1, wherein respective identifications of the neighboring base stations are predetermined and recorded, in advance, in the base station of concern.

9. A base station including a resource allocation control unit which allocates a new radio resource to a link between the base station and a requesting mobile station in a cell site of the base station, the resource allocation control unit comprising:
 a first unit detecting use-state information of radio resources in the cell site of the base station of concern and in respective cell sites of neighboring base stations and priority information of mobile stations using the same radio resources of both the base station of concern and the neighboring base stations by accessing an external radio resource management table;
 a second unit allocating a new radio resource to the link between the base station of concern and the requesting mobile station based on the use-state information and the priority information;
 a determining unit determining whether a an up/down link direction related to a non-allocated radio resource in the cell site of the base station of concern is the same as an up/down link direction related to an allocated radio resource in one of the cell sites of the neighboring base stations, wherein
 said second unit allocates the new radio resource to the link based on both the use-state information and the priority information detected by the first unit and based on a result of the determination provided by the determining unit;
 a third unit determining whether a level of priority of the requesting mobile station is higher than a level of priority of each of the mobile stations using the radio resources allocated in the cell sites of the neighboring base stations, based on the priority information related to the base station of concern and the priority information related to the neighboring base stations; and
 a fourth unit determining whether allocation of the non-allocated radio resource in the cell site of the base station of concern to the link is possible.

10. The base station according to claim 9, wherein a radio network controller maintains a radio resource management table, and, said first unit detects the use-state information and the priority information from the radio resource management table of the radio network controller by sending an inquiry from the base station of concern to the radio network controller.

11. The base station according to claim 9, wherein a radio network controller maintains a radio resource management table, and, when the radio resource allocation and radio resource releasing are performed, the resource allocation control unit transmits a radio resource notification to the radio network controller so that the radio resource management table is updated.

12. The base station according to claim 9, wherein each of the base station of concern and the neighboring base stations maintains the use-state information of that base station and the priority information of the mobile stations related to that base station, and said first unit detects the use-state information and the priority information from the respective neighboring base stations by sending an inquiry from the base station of concern to each of the respective neighboring base stations.

13. The base station according to claim 12, wherein, when transmitting the inquiry, the use-station information or the priority information between the base station of concern and each of the neighboring base stations, a dedicated radio channel is used as a path of the data transmission.

14. The base station according to claim 9, wherein each of the base station of concern and the neighboring base stations maintains the use-state information of that base station and the priority information of the mobile stations related to that base station, and, when an inquiry from one of the neighboring base stations is received at the base station of concern, the base station of concern transmits to said one of the neighboring base stations the use-state information and the priority information both related to the base station of concern.

15. The base station according to claim 14, wherein, when transmitting the use-station information or the priority information between the base station of concern and said one of the neighboring base stations, a dedicated radio channel is used as a path of the data transmission.

16. The base station according to claim 9, wherein respective identifications of the neighboring base stations are predetermined and recorded, in advance, in the base station of concern.

* * * * *